March 31, 1931.  W. E. POTTER  1,798,808
BRAKING ATTACHMENT
Filed Sept. 26, 1928
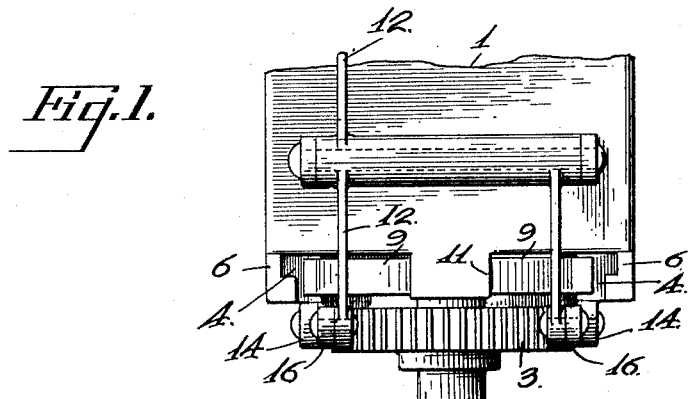
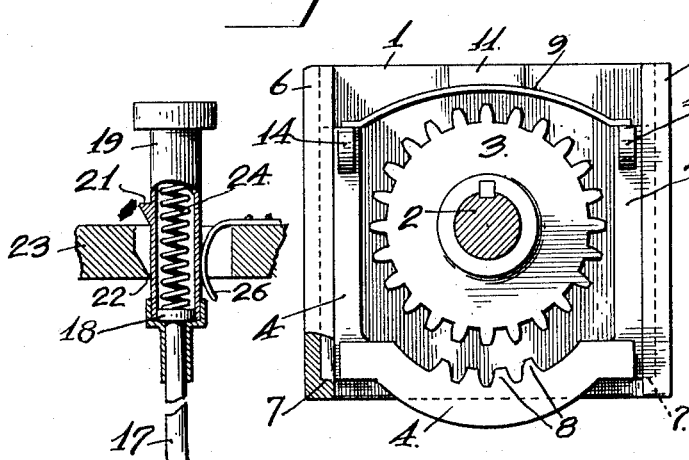
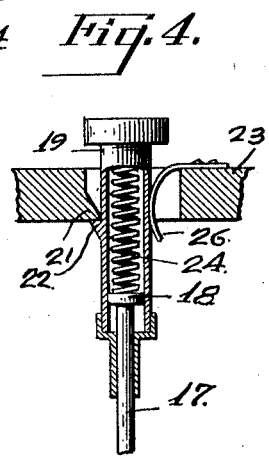
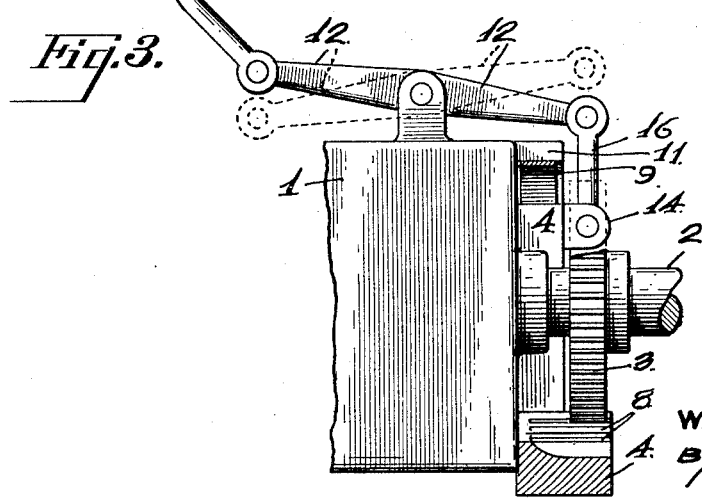
INVENTOR.
WALLACE E. POTTER.
ATTY.

Patented Mar. 31, 1931

1,798,808

UNITED STATES PATENT OFFICE

WALLACE E. POTTER, OF SAN FRANCISCO, CALIFORNIA

BRAKING ATTACHMENT

Application filed September 26, 1928. Serial No. 308,533.

My invention relates to improvements in braking attachments for motor vehicles and the like wherein a yoke, slidably mounted upon the transmission housing, and operable from the operator's position in said vehicle, operates in conjunction with yieldable or resilient means for moving said yoke into positive engagement with the drive shaft of a motor vehicle when parked, to prevent rotation of said shaft and thereby further prevent accidental movement of said vehicle.

The primary object of the present invention is to provide improved means for positively locking the running gear of a motor vehicle when parked to prevent accidental movement of said vehicle.

Another object is to provide improved yieldable or resilient means for moving said locking means into positive engagement with said running gear.

A further object is to provide a new and improved device of the character set forth operable from the operator's or driver's position in said vehicle.

A still further object of the present invention is to provide an improved device of the type described wherein the parts are simple and few in number, whereby economy of construction may be had, and having a maximum efficiency and easily and readily operated.

I accomplish these and other objects by means of the preferred form of the invention disclosed in the drawings forming a part of the present application wherein like characters of reference are used to designate similar parts throughout the specification and drawings, and in which—

Fig. 1 is a broken plan view of my improved attachment;

Fig. 2 is a front elevation thereof, partly in section, with the actuating members removed, and in an inoperative position;

Fig. 3 is a broken side elevation, partly in section, of the device, also disclosing the actuating means, the view disclosing the inoperative position, and an operative position being partly illustrated in dotted lines; and Fig. 4 is a view of the yieldable or resilient actuating means in operative position.

Referring to the drawings: the numeral 1 is used to designate in general a motor vehicle transmission housing having the usual drive shaft 2 extending rearwardly therefrom. In the present invention I have provided a gear 3 which is rigidly keyed or otherwise secured to said shaft 2. A yoke 4 is slidably mounted upon the side of the housing 1 by means of grooved members 6 each provided with shoulders or stops 7 in the lower ends thereof to limit the downward movement of said yoke 4, as disclosed, partly in section, in the lower left hand corner of Fig. 2 of the drawings, the purpose of which will hereinafter be more fully set forth.

The yoke 4 is provided with a plurality of teeth 8 arranged to positively engage the teeth of the gear 3 when said yoke 4 is moved into operative position, for the purpose of locking the running gear of the vehicle against movement when the vehicle is parked.

In order to normally retain the yoke in an inoperative or disengaging position, to prevent inadvertent or accidental locking of the running gear while the vehicle is in motion, I have provided a suitable spring 9 whose approximate central portion is secured on the underside of a centrally disposed lug 11, extending from the top of the housing 1, the outer ends of said spring 9 resting upon the upper ends of the yoke 4, as disclosed in Fig. 2 of the drawings.

In order to move the locking device or yoke 4 into engaging relation with the gear 3 I have provided the pivotally mounted lever 12 on top of the housing 1 and extending directly over lugs 14 on the upper end of the yoke 4 and connected to said lugs 14 by means of suitable connecting links 16. The opposite end of the lever 12 has pivotally connected thereto a rod 17 terminating at its upper end in a piston 18 slidably mounted within a cylindrical plunger 19 provided in turn with a stop 21 arranged to engage a reversely positioned stop 22 within one side of an aperture within a foot-board 23.

A suitable spring 24 is interposed between the piston 18 of the rod 17 and the upper inner end of the cylindrical plunger 19.

A second spring 26 is disposed within said aperture of the foot-board 23 in such a manner as to normally retain the plunger 19 in contact with the second stop 22 in order to insure engagement of the stop 21 with the stop 22 when the plunger 19 is depressed.

In operation, the spring 9 assisted by the attraction of gravity, normally prevents the yoke 4 and the teeth 8 thereon from moving upward to engage the teeth of the gear 3.

When the vehicle is parked, on a level or inclined roadway, in order to rigidly and positively engage the running gear of a vehicle to prevent rotating of the shaft 2 and consequent movement of the vehicle, not shown, the yoke 4 and teeth 8 thereon are moved to thus positively engage said gear 3 and the teeth thereon in the following manner:

By pressing downwardly with the foot of an operator from his driver's position within said vehicle, the plunger 19 is moved downwardly until the stop 21 upon the said plunger 19 passes below and engages the stop 22, as disclosed in Fig. 4 of the drawings, being held normally in this position by the tension of the spring 26 and also by the fact that the vertical longitudinal center of the plunger 19 and its telescoping rod 17 are positioned beyond the pivotal point of said rod with its supporting lever end 12.

When the plunger 19 is depressed the tension of the spring 24 within said plunger 19, acting upon the piston 18 in turn depresses the rod 17 and its corresponding end of the lever 12, thereby causing the opposite end of said lever 12, through the medium of the connecting links 16, to elevate the yoke 4 and teeth 8 thereon and move said teeth 8 into position engaging relation with the teeth of the gear 3 and thereby positively lock the drive shaft 2 against rotation and consequently prevent accidental or other movement of the vehicle.

If, when the vehicle is stopped, and the plunger 19 depressed or actuated, it should happen that the teeth 8 of the yoke 4 and the gear 3 are not in registration or engaging position, the teeth 8 of said yoke 4 may impinge and come to rest upon the top of the teeth of the gear 3 and thus prevent a positive engaging relation of said yoke with said gear. In this case a greater tension will be exerted upon the spring 24 within the plunger 19 and the piston 18 and rod 17 will be moved into the plunger as disclosed in Fig. 4 of the drawings.

From the foregoing it will be obvious that a yielding or resilient actuating or operating mechanism for the yoke 4 will be provided, so that a slight movement of the vehicle, after the plunger 19 has been depressed to locking position, will cause the gear 3 to rotate in a corresponding direction and the compressed spring 24 will then immediately move the teeth 8 of the yoke 4 into positive locking engagement with the gear 3 as soon as said teeth 8 come into registration with the teeth of the gear 3.

In this manner the yoke or locking device may be brought into effective locking position by the simple expedient of depressing the plunger 19 until the stops 21 and 22 engage, regardless of whether the teeth of the yoke are in registration with the teeth of the gear 3 or not.

Thus, an accidental or other movement of a vehicle will be prevented when said vehicle is parked upon a level or inclined roadway.

In order to unlock the yoke 4 from the gear 3 the plunger 19 is moved by the foot of the operator, from the driver's position, by moving said plunger 19 backwardly against the tension of the spring 26 when the combined tensions of the springs 9 and 24, plus the action of gravity on the yoke 4, will move the plunger 19 upwardly and, through the medium of the pivoted lever 12, move the yoke 4 downwardly and out of registration and engaging relation with the gear 3.

It is intended that the tension of the spring 24 within the plunger 19 will be greater than the tension of the spring 9, said spring 9 requiring only sufficient tension to assist gravity in moving the yoke 4 out of engaging relation with the gear 3, and also to retain said yoke out of such engagement and against the shoulders or stops 7 in the lower portions of the grooved members 6 on the transmission housing 1.

Having thus described my invention what I claim as new and desire to secure by Letters Patent is—

1. The combination with the transmission housing and drive shaft of a motor vehicle of a gear secured to said drive shaft adjacent said housing; vertical guides mounted upon the housing on opposite sides of the drive shaft; a yoke slidably mounted upon said guides and having a toothed portion extending between the guides below the shaft and gear for engaging the teeth of said gear, said yoke being normally actuated by gravity to an inoperative position out of engagement with the teeth of the gear; and means operable from the driver's position of said vehicle for moving said yoke and the teeth thereon upwardly against the force of gravity into engaging relation with the teeth of said gear whereby rotating of said shaft and accidental movement of said vehicle may be prevented.

2. The combination with the transmission housing and drive shaft of a motor vehicle, of a gear secured to said shaft adjacent said housing; a yoke slidably mounted upon said housing and having teeth movable to engage the teeth of said gear, said yoke being normaly actuated by gravity to an inoperative position out of engagement with the teeth of the gear; means for normally resisting movement of said yoke from its normal inoperative position into engagement with said gear-teeth; and yieldable means operable from the driver's position of said vehicle for moving said yoke and the teeth thereon into engagement with the teeth of said gear whereby rotation of said shaft and accidental movement of said vehicle may be prevented.

3. The combination with the transmission housing and drive shaft of a motor vehicle, of a gear secured to said drive shaft adjacent said housing; a yoke slidably mounted for vertical movement upon said housing and having teeth for engaging the teeth of said gear when said yoke is moved upwardly against the action of gravity; a spring mounted upon said housing and normally cooperating with gravity to resist movement of said yoke into engagement with said gear; and yieldable means operable from the operator's position of said vehicle for moving said yoke and the teeth thereon into engaging relation with the teeth of said gear whereby rotation of the drive shaft and accidental movement of the vehicle may be prevented.

4. The combination with the transmission housing and drive shaft of a motor vehicle, of a gear secured to said shaft adjacent said housing; a locking member slidably mounted adjacent the gear and movable to engage said gear to prevent rotation of said shaft; and yieldable means for moving said locking member from a normal inoperative position to an operative gear engaging position, said means comprising a piston and means connecting said piston to the locking member, a slidably mounted plunger slidably engaging the piston, and a spring mounted within the plunger and imparting a yielding pressure upon the piston when the plunger is moved to a locking position.

5. The combination with a transmission housing and drive shaft of a motor vehicle, of a gear secured to said shaft adjacent said housing; a locking member slidably mounted adjacent the gear and movable to engage said gear to prevent rotation of said shaft; and yieldable means for moving said locking member from a normal inoperative position to an operative gear engaging position, said means comprising a piston and means connecting said piston to the locking member, a slidably mounted plunger slidably engaging the piston, and a spring mounted within the plunger and imparting a yielding pressure upon the piston when the plunger is moved to a locking position; and a spring normally holding the locking member in its inoperative position.

In witness whereof, I hereunto set my signature.

WALLACE E. POTTER.